No. 684,456. Patented Oct. 15, 1901.
F. D. PHILP.
ROD PACKING.
(Application filed May 17, 1901.)
(No Model.)
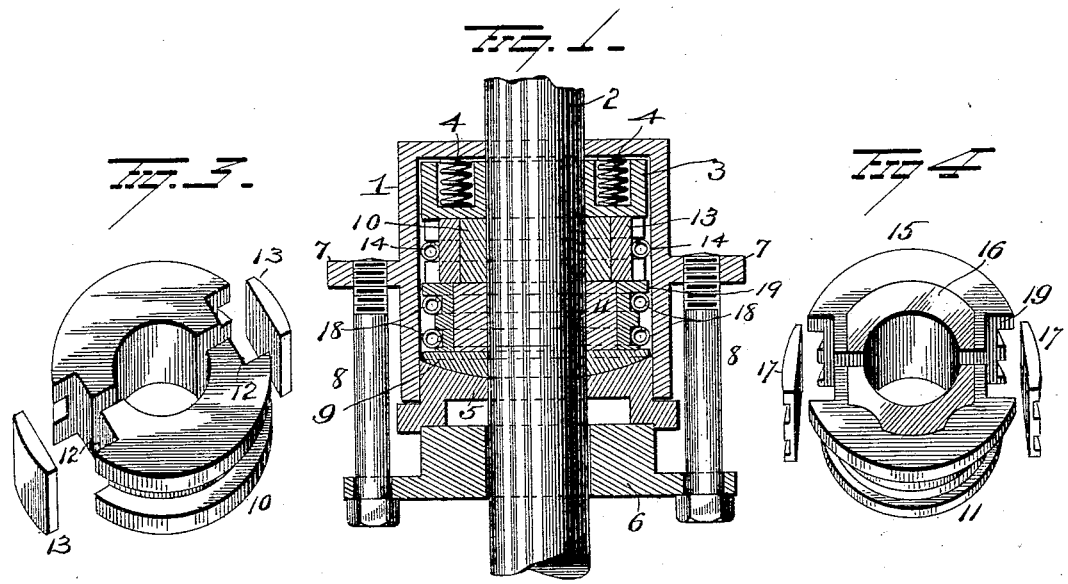
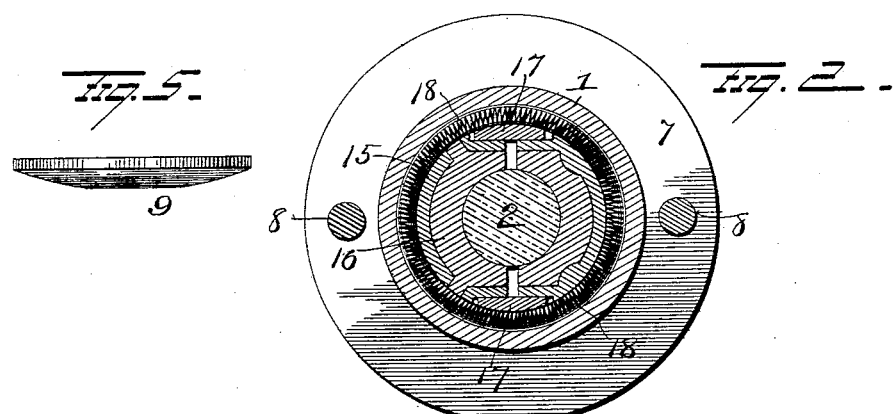
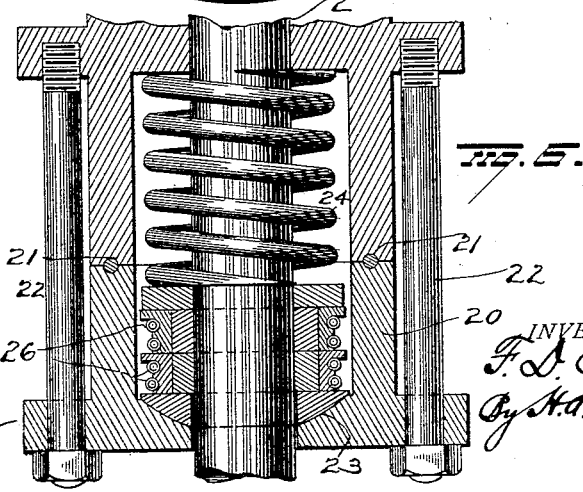
WITNESSES
INVENTOR
F. D. Philp
Attorney

UNITED STATES PATENT OFFICE.

FREDERICK D. PHILP, OF BUFFALO, NEW YORK.

ROD-PACKING.

SPECIFICATION forming part of Letters Patent No. 684,456, dated October 15, 1901.

Application filed May 17, 1901. Serial No. 60,750. (No model.)

*To all whom it may concern:*

Be it known that I, FREDERICK D. PHILP, a resident of Buffalo, in the county of Erie and State of New York, have invented certain new and useful Improvements in Rod-Packings; and I do hereby declare the following to be a full, clear, and exact description of the invention, such as will enable others skilled in the art to which it appertains to make and use the same.

My invention relates to an improvement in rod-packings, the object of the invention being to provide a packing-ring comprising an outer ring of hard metal and an inner ring of soft metal, which latter can be readily replaced when worn.

A further object is to provide a packing-ring with improved steam-tight connection between its sections which will permit of independent movement of the sections without affecting the steam-tight connection.

A further object is to provide an improved packing in which the rings cannot jamb and which will allow of excessive vibration and not be injured thereby.

With these objects in view the invention consists in certain novel features of construction and combinations and arrangements of parts, as will be more fully hereinafter described, and pointed out in the claims.

In the accompanying drawings, Figure 1 is a view in section illustrating my improvements. Fig. 2 is a view in section on the line $x$ $x$ of Fig. 1. Figs. 3, 4, and 5 are detail views of the packing-rings removed, and Fig. 6 is a view in section of a modified form of packing.

1 represents the ordinary stuffing-box of an engine, and 2 the piston-rod passing therethrough.

In the inner end of the stuffing-box 1 a follower-ring 3 is located and is provided in its inner face with sockets to receive coiled springs 4, bearing against the inner end of the stuffing-box to press the follower outward for a purpose which will more fully hereinafter appear. In the outer end of the stuffing-box an auxiliary gland 5 is held in place by the main gland 6, which latter is secured to a flange 7 on the stuffing-box by screws or bolts 8, as shown. The inner face of the auxiliary gland is made concave and has disposed thereagainst a ring 9, having a convex outer face to snugly fit into the concave face of the auxiliary gland, thereby permitting vibration of the piston-rod without affecting the steam-tight joint between the ring and gland. Between the ring 9 and follower 3 my improved sectional packing-rings 10 and 11 are located and constructed as follows: Ring 10 is preferably composed of soft metal made in two semicircular sections and provided on their outer faces at their meeting ends with flat seats or shoulders 12 to receive flat blocks or plates 13 and form steam-tight joints therewith. A peripheral groove is made in the ring 10 to receive a coiled spring 14 to hold the sections thereof in firm contact with the rod and the blocks or plates 13 on the shoulders 12 and force the sections toward each other and take up wear.

The packing-ring 11 comprises an outer ring 15, of hard metal, and an inner filling 16, of soft metal, to engage the rod, the hard-metal ring so constructed as to key the soft metal thereto, which may be done by providing openings in the hard-metal ring or enlargements on its inner face. This packing-ring 11 is also made in two sections and is provided on the outer face of the hard-metal ring at the juncture of its sections with flat shoulders or seats for blocks or plates 17, and said outer ring and blocks or plates are preferably made with parallel peripheral grooves to receive coiled springs 18 to hold the sections in engagement with the rod and the blocks or plates in steam-tight engagement on the shoulders. A peripheral flange 19 is provided on one side of ring 11 to prevent the escape of the springs, but may be dispensed with, if desired.

With my improvements in operation the rings 10 and 11 are disposed with their end sections out of alinement and tight together and against ring 9 by the follower 3, thus preventing any possibility of the escape of steam.

Instead of constructing my improvements as above described I might make the same as shown in Fig. 6. In this form of my invention the gland 20 is made elongated and hollow to form a chamber to receive the packing and is held tight against a wire ring 21 between the stuffing-box and gland by bolts 22. The inner face of gland 20 is made concave to receive the convex outer ring 23, and a coiled spring 24 is located on the rod and bears at its respective ends against the inner end of the stuffing-box and follower-ring 25 to hold packing-rings 26 tightly against ring 23. These packing-rings 26 are shown constructed like ring 11 of the preferred form of my invention, but may, if desired, be made like ring 10, or both rings 10 and 11 may be employed.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a piston-rod packing, the combination with a stuffing-box and a main gland, of a supplemental gland having a concave inner face, a ring having a concave face bearing against the concave face of the supplemental gland, a two-part packing-ring having soft metal to bear against the piston-rod, flat blocks overlapping the joints of the parts of the packing-ring, a spring encircling said packing-ring and blocks and a spring-pressed follower pressing the packing-ring against the convex ring and pressing the latter against the concave seat of the supplemental gland.

2. A packing-ring for rod-packing, comprising an outer sectional ring of hard metal, an inner sectional ring of soft metal keyed to the outer ring, flat shoulders at the meeting ends of the hard-metal ring-sections flat blocks or plates on said shoulders overlapping the respective sections, and a spring around said sections pressing them together and holding the blocks or plates tightly on the shoulders.

In testimony whereof I have signed this specification in the presence of two subscribing witnesses.

FREDERICK D. PHILP.

Witnesses:
FRANCIS LENEY, Jr.,
JOHN W. BRADLEY.